C. E. CAIN.
AUTOMATIC CLUTCH RELEASE.
APPLICATION FILED FEB. 26, 1921.
1,418,619.
Patented June 6, 1922.
2 SHEETS—SHEET 1.
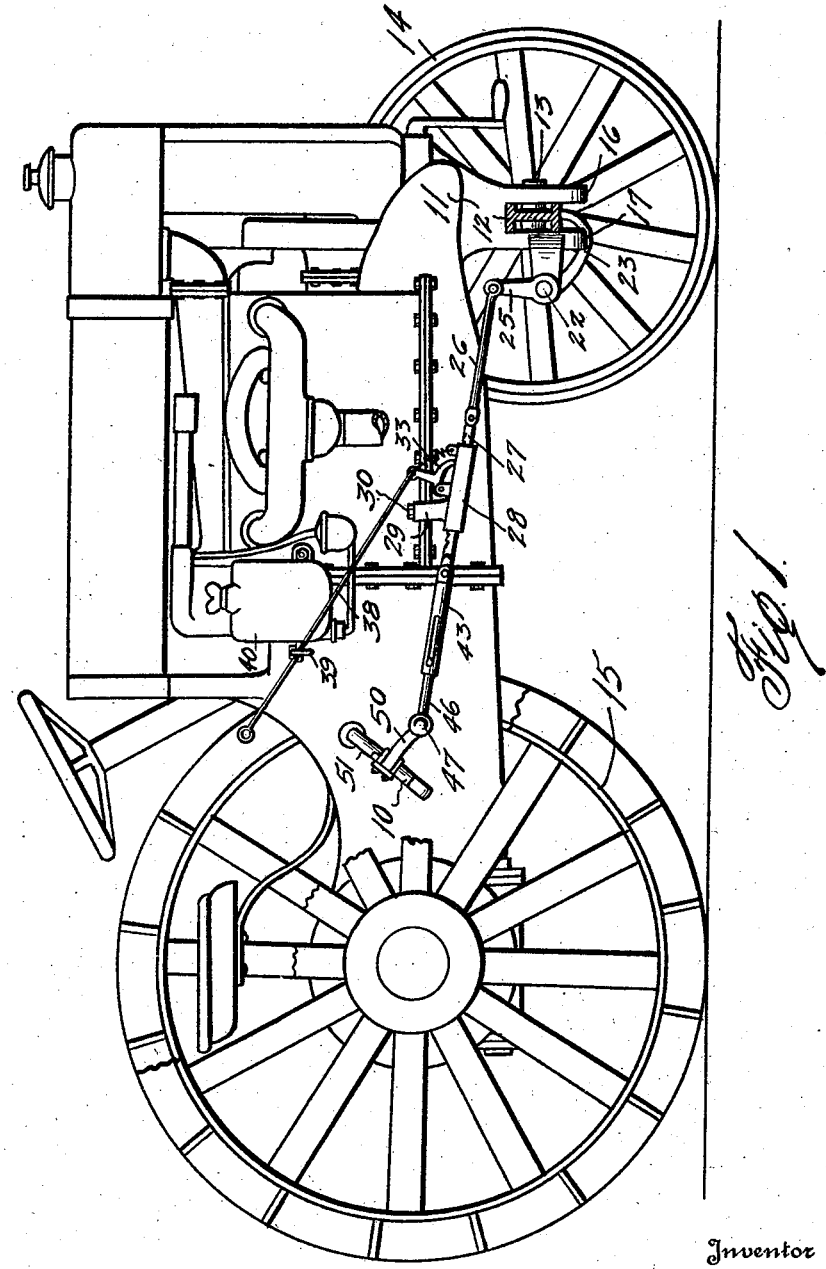

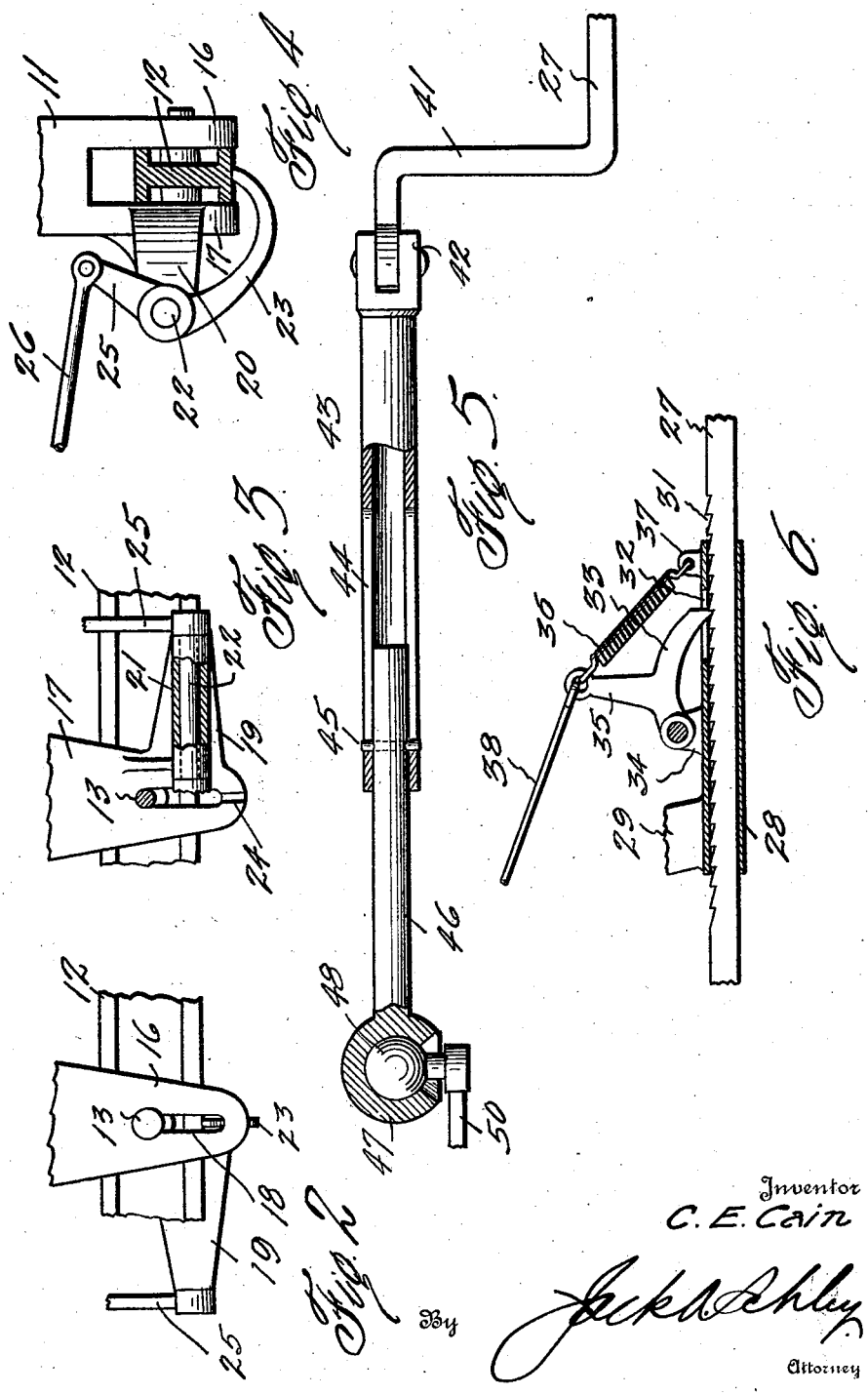

UNITED STATES PATENT OFFICE.

CLARENCE E. CAIN, OF WILMER, TEXAS.

AUTOMATIC CLUTCH RELEASE.

1,418,619. Specification of Letters Patent. Patented June 6, 1922.

Application filed February 26, 1921. Serial No. 448,279.

*To all whom it may concern:*

Be it known that I, CLARENCE E. CAIN, a citizen of the United States, residing at Wilmer, in the county of Dallas and State of Texas, have invented certain new and useful Improvements in Automatic Clutch Releases, of which the following is a specification.

This invention relates to new and useful improvements in automatic clutch releases. The invention has particularly to do with an automatic clutch release for a tractor. Certain types of tractors frequently turn turtle when the clutch pedal is released on certain kinds of ground. The clutch effects a sudden engagement, whereby the front end of the tractor swings upward and often turns completely over backward and injures the driver. The principal object of the invention is to provide means automatically operated by the front axle to operate the clutch when the front end of the tractor is lifted, whereby the clutch is disengaged and the front end of the tractor permitted to drop before it has been raised to a point sufficient to turn over backwardly. Another feature resides in means for holding the clutch out of engagement until released by the operator.

A construction designed to carry out the invention will be hereinafter described together with other features of the invention.

The invention will be more readily understood from a reading of the specification and by reference to the accompanying drawings, in which an example of the invention is shown and wherein:

Fig. 1 is a side elevation of a tractor equipped with a release device constructed in accordance with my invention, Fig. 2 is a detail in front elevation of the mechanism associated with the axle, Fig. 3 is a rear elevation of the same, Fig. 4 is a side elevation of the same, Fig. 5 is a detail of the telescoping and ball and socket joints of the device, and Fig. 6 is a detail of the retaining device.

In the drawings the numeral 10 designates the clutch pedal of a tractor, 11 the front axle casting, 12 the front axle and 13 the pivot bolt on which the front axle is pivoted. The front axle is mounted on wheels 14 and the rear of the tractor is supported on wheels 15.

My invention is made in the form of an attachment, so as to be applied to the tractor without extensive alterations. The only change made in the tractor is in the case of the front casting 11. The casting is either altered or another substituted therefor. The lower furcations 16 and 17 of the casting 11, are each provided with a vertical slot 18 in which the pivot bolt 13 is mounted. Normally the pivot bolt is at the top of the slots. A laterally extending arm 19 is cast or otherwise provided on one side of the furcation 17 and has a rearwardly extending bracket 20 along the rear edge of which a bearing sleeve 21 is secured. A rock shaft 22 is mounted in the sleeve and on its inner end is secured the upper end of a curved tripping lever 23 having its free end bearing against the underside of the axle 12, and engaging in a vertical slot 24 in the lower end of the part 17. This lever is fastened to the shaft 22 so as to rock the same.

On the outer end of the shaft an upwardly extending arm 25 is mounted. The upper end of the arm is pivoted to a link 26 which is pivoted at its rear end to a slide bar 27, angular in cross section and passing through a housing 28. The housing has an upwardly extending and inwardly bent bracket 29 by which it is supported. This bracket is secured in place by one of the crank case bolts 30 of the tractor. Ratchet teeth 31 are provided in the upper side of the bar 27 and are exposed through a slot 32 in the housing. A pawl 33 is pivoted between a pair of ears 34 on top of the housing so that its point engages the teeth 31 through the slot 32. The pawl is provided with an upstanding arm 35 which has an eye at its upper end receiving one end of a coiled spring 36 as is best shown in Fig. 6. The lower and forward end of the spring 36 is attached to an ear 37 on the forward end of the housing, whereby the pawl is held in contact with the ratchet teeth. The ratchet teeth are arranged so that the bar 27 may slide forwardly under the pawl, but will catch on said pawl and prevent a rearward movement of said bar until the pawl is raised. For raising the pawl I provide a rod 38 having its forward end engaging in the eye of the arm 35 and passing through a bracket 39 which is attached to one of the bolts holding the fuel tank 40 or any other suitable place.

The bar 27 has an inwardly off set extension 41 at its rear end pivoted in the jaw 42 at the forward end of a tubular member 43 having longitudinal slots 44 receiving a cross pin 45 carried by a shank 46 telescoping into the member. At its rear end the shank 46 carries a socket 47 receiving a ball 48 as is best shown in Fig. 5. The ball is off set laterally from the forward end of an arm 50 which is clamped to the clutch pedal 10 by a screw bolt 51 or in any other suitable manner. By reason of the telescoping shank 46 the pedal 10 may be freely depressed without disturbing the releasing device as is obvious.

The operation of the device is as follows: Should the front end of the tractor be lifted the axle 12 will remain stationary, the pivot bolt 13 and slots 18 undergoing relative movement, whereby the casting 11 is carried upwardly. When the casting 11 is moved upwardly, the axle resting on the end of the lever 23 will cause the same to swing whereby the shaft 22 will be rocked and the arm 25 swung forwardly. The forward movement of the arm 25 exerts a forward pull on the rod 26 which in turn pulls the bar 27 forwardly so that the teeth 31 ride under the pawl 33, whereby the parts are held in the position to which they are moved. The bar 27 pulls the member 43 and the shank 46 forwardly whereby the arm 50 is swung and the clutch pedal 10 depressed, thereby throwing the clutch out of engagement. When the clutch is thrown out of engagement the front end of the tractor will drop so that the axle will move relatively upward whereby the pivot bolt 13 will be at the upper ends of the slots. The clutch pedal will be held depressed until the bar 27 is released by pulling on the rod 38 and raising the pawl 33 from the teeth 31.

Various changes may be made in the size and shape of the parts and modifications and alterations may also be made without departing from the spirit of the invention.

What I claim, is:

1. In an automatic clutch release attachment, a lever, means for supporting the lever in position to be operated by the axle of the tractor, a swinging arm connected with the lever, a clamp for engagement with the clutch pedal of a tractor, and a connection between the arm and the clamp.

2. In an automatic clutch release attachment, a lever, means for supporting the lever in position to be operated by the axle of the tractor, a swinging arm connected with the lever, a clamp for engagement with the clutch pedal of a tractor, a connection between the arm and the clamp, and means for rocking the connection against retractive movement after it has been pulled forwardly by the swinging arm.

3. In an automatic tractor clutch release device, the combination with the clutch pedal and the front axle of a tractor, said axle having vertically sliding engagement with the tractor, of a tripping lever pivoted adjacent the axle and having its swinging end disposed under said axle, a swinging arm connected with the lever, a member clamped to the clutch pedal, and a jointed connection between the swinging arm and said member.

4. In an automatic tractor clutch release device, the combination with the clutch pedal and the front axle of a tractor, said axle having vertically sliding engagement with the tractor, of a tripping lever pivoted adjacent the axle and having its swinging end disposed under said axle, a swinging arm connected with the lever, a member clamped to the clutch pedal, and a jointed connection between the swinging arm and said member, said jointed connection having a telescoping portion for permitting operation of the clutch pedal without swinging the arm and lever.

5. In an automatic tractor clutch release device, the combination with the clutch pedal and the front axle of a tractor, said axle having vertically sliding engagement with the tractor, of a tripping lever pivoted adjacent the axle and having its swinging end disposed under said axle, a swinging arm connected with the lever, a member clamped to the clutch pedal, a jointed connection between the swinging arm and said member, a locking device engaging the jointed connection for holding the same in its forwardly displaced position, and means for releasing said locking means to free the connection.

6. In an automatic clutch release device for tractors, the combination with the clutch pedal, the forward casting, the front axle which is pivoted and vertically slidable in said casting, of a bracket carried by the casting, a rock shaft mounted in the bracket, a tripping lever attached to one end of the shaft and engaging under the axle, a swinging arm attached to the other end of the shaft, a clamp arm secured to the clutch pedal, a jointed connection between the clamp arm and the swinging arm, a housing through which the connection passes, said connection having ratchet teeth, a pawl mounted on the housing and engaging the ratchet teeth, and means for swinging the pawl to withdraw it from said teeth.

In testimony whereof I affix my signature.

CLARENCE E. CAIN.